United States Patent [19]
Bollman et al.

[11] Patent Number: 5,289,297
[45] Date of Patent: Feb. 22, 1994

[54] CONVERTING LINES TO OTHER COLORS

[75] Inventors: James E. Bollman, Williamson; Dennis L. Venable, Rochester, both of N.Y.

[73] Assignee: Xerox Corporation, Stamford, Conn.

[21] Appl. No.: 769,683

[22] Filed: Oct. 2, 1991

[51] Int. Cl.$^5$ ............................................. H04N 1/46
[52] U.S. Cl. .................... 358/537; 358/530; 358/464
[58] Field of Search ............ 358/75, 80, 79, 462, 358/464, 465, 466, 81, 530, 537, 538, 540; 395/131

[56] References Cited

U.S. PATENT DOCUMENTS

| | | | |
|---|---|---|---|
| 3,706,841 | 12/1972 | Novak. | |
| 3,784,736 | 1/1974 | Novak. | |
| 4,608,596 | 8/1986 | Williams et al. | 358/81 |
| 4,862,256 | 8/1989 | Markle et al. | 358/81 |
| 4,878,181 | 10/1989 | MacKenna et al. | 395/131 |
| 4,975,768 | 12/1990 | Takaraga | 358/538 |
| 5,055,944 | 10/1991 | Shibahara | 358/464 |
| 5,159,443 | 10/1992 | Ando | 358/81 |

FOREIGN PATENT DOCUMENTS

| | | |
|---|---|---|
| 0183539 | 6/1986 | European Pat. Off. . |
| 0305126 | 3/1989 | European Pat. Off. . |
| 57-99088 | 6/1982 | Japan . |
| 60-141093 | 7/1985 | Japan . |

Primary Examiner—Edward L. Coles, Sr.
Assistant Examiner—Scott A. Rogers
Attorney, Agent, or Firm—Mark Costello

[57] ABSTRACT

A method for varying the color of an image including lines and background. Where the image includes the colors black and white and a plurality of gray pixels, where gray refers to the presence of pixel values between the maximum and minimum pixel values, inclusive, the image is first converted to a color space, such as for example, r, g, b (red-green-blue). Pixel values are thresholded for differentiation between lines and background. When pixels have a value indicating that the pixel is background, that pixel is set to a background color that has been previously selected. Otherwise, that pixel is set to a foreground color. The result is that background is set to a single color, and lines are set to a second color. Alternatively, where intermediate values are present, the foreground color value may be added to the intermediate level color value to produce a gradually varying colored line.

9 Claims, 5 Drawing Sheets

CONVERTING LINES TO OTHER COLORS

The present invention relates generally to color imaging, and more particularly, to varying the colors of lines and background in images.

CROSS REFERENCE

Cross reference is made to U.S. patent application Ser. No. 07/404,395 by Venable et al., entitled "Color Set Selection and Color Imaging", assigned to the same assignee as the present application, and U.S. patent application Ser. No. 07/517,895 by Bollman et al., entitled "Color Editing with Simple Encoded Images," assigned to the same assignee as the present application.

BACKGROUND OF THE INVENTION

Black and white photos and line art images are available from many sources for integration into documents. In electronic document creation this is easily done on several possible levels, including the derivation of the black and white image by scanning. Alternatively, a large number of computer systems still produce images that are black and white. In either case, in the production of colored documents, it is often desirable to convert black and white images to colors to produce a visually pleasing result. In broader terms however, it is desirable to convert lines or background of any color to other colors on a differentiated basis.

U.S. Pat. No. 4,608,596 to Williams et al. discloses a system for the colorization of monochrome video frames under operator control including a video color encoder. The encoder has a luminance input and a plurality of color component inputs. The luminance signal is derived from a monochrome video signal, and an operator assigns color component signals to selected regions of pixels of the video frame. The color video output of the color video encoder can be displayed and recorded.

U.S. Pat. Nos. 3,706,841 and 3,784,736, both to Novak, disclose methods for converting black and white monochrome images to multi-color pictures. The method uses a video camera to scan a black and white monochrome image. Luminance values of the scanned black and white image are combined with selected color signals to create a colorized image. Additionally, in the '736 patent, the image can be separated into foreground and background memories, which may be operated on independently.

U.S. Pat. No. 4,862,256 to Markle et al. discloses a method of coloring a black and white video signal in which different parts of a frame are assigned a particular color on the basis of gray levels or luminance values.

Japanese Patent No. 57-99088 to Watanabe discloses a system for providing a simulated color picture from a black and white picture. In the system, a color subcarrier signal is arbitrarily selected and synthesized to provide a simulated color picture.

Japanese Patent No. 60-141093 to Mizuguchi discloses a method of coloring a picture. The picture is converted to a video signal and a luminance signal is separated from it. As a result of a coloring process executed on the basis of a profile picture formed from the video, a chrominance signal is output, and mixed with the luminance signal.

All the references cited hereinabove are specifically incorporated by reference.

SUMMARY OF THE INVENTION

The present invention is directed to an arrangement that varies the color of lines and background in an image on a differentiated basis.

In accordance with one aspect of the invention, there is provided a method for varying color of lines and background in an image on a differentiated basis in an image defined by pixels, each pixel having a value indicative of an optical density value of the image at a discrete point therein. Lines include a set of pixels having optical density values distinct from optical density values of pixels in background. The method entails the steps of: a) converting the value any black pixel to a combination of red, green and blue values, where combinations of red, green and blue values defined all possible colors in a color set, and black values are converted to a combination of red, green and blue values where the red value=green value=blue value; b) selecting foreground and background colors each identified in terms of red, green and blue values; c) comparing the red, green and blue values of each pixel with a reference value; d) determining from the comparison whether the pixel is a background pixel; and e) for each background pixel so determined, changing the pixel value to the background color while changing all other pixels to the foreground color.

In accordance with another aspect of the invention, when pixels have a value indicating that the pixel is background, that pixel is set to a background color that has been previously selected. To maintain gray gradations of lines in the image, the foreground pixel values are set to the pixel value plus the selected foreground color value. The result is that background is set to a single color, and gray lines are set to a foreground color that maintains a range of density values. Solid black lines are converted to the foreground color without density gradation.

In accordance with yet another aspect of the invention, using a second comparison step, foreground pixels are detected separately from background pixels. Accordingly, pixels that are neither foreground or background pixels may be treated in a separate manner, which includes no treatment at all.

These and other aspects of the invention will become apparent from the following description used to illustrate a preferred embodiment of the invention read in conjunction with the accompanying drawings in which.

Figure 1:
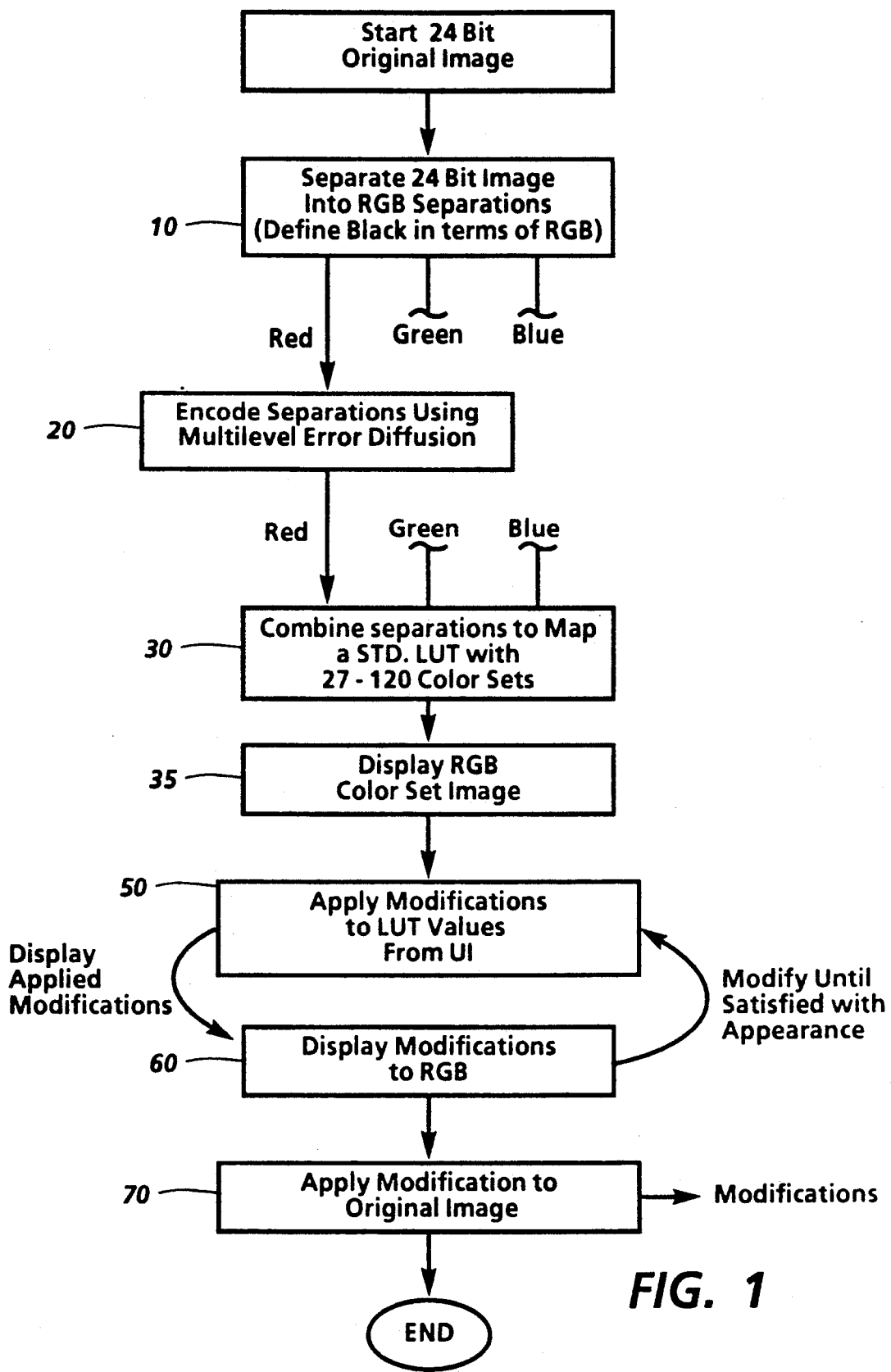
FIG. 1 shows a step-by-step flow chart of a reduced color set selection process in which the invention might find use.

With reference now to the drawings, where the showings are for the purpose of illustrating an embodiment of the invention and not for the purpose of limiting same, FIG. 1 shows a flow chart of a color editing process that will be referred to in describing the invention.

High quality, high density CRT displays reproduce color images in red, green and blue components. Each pixel in the color image, produced in accordance with several known processes, may be defined with a 24 bit value, which provides three color separations, each represented by an 8 bit value. Accordingly, the color set or palette available for use in such displays has about 16 million colors. In the embodiment described, a Sun Microsystems workstation having 8 bit deep graphics, with a Unix operating system was used for color modification of images. Sun Microsystems workstations are the product of Sun Microsystems, Inc. of Sunnyvale, Calif. The workstations used in the development of the described invention may be characterized as personal minicomputers, with multitasking operations. User data entry at the workstation is typically provided through a keyboard and a mouse. Of course, such features are not required, and other processors and data entry devices are possible. The graphics display used was a standard Sun Microsystems 1152×900, 8 bit deep display. Programs implementing the described invention were produced in the "C" language. The user interface that will be further described hereinbelow was produced using the X-Windowing System software, from the Massachusetts Institute of Technology, Cambridge, Mass. A similar user interface development tool is the Sun X-News software, a proprietary software of Sun Microsystems, Inc. Of course, other graphics display systems, and other software may be used to the same effect as those used to produce the present invention. Another suitable device for implementing the present invention might be one of the Macintosh II family of products, produced by Apple Corporation of Cupertino, Calif.

In an example system for editing color images, color images are provided at $256^3$ different density levels. This number of levels is generally considered too complex to easily deal with. The method described in U.S. patent application Ser. No. 07/517,895 by Bollman et al., entitled "Color Editing with Simple Encoded Images," assigned to the same assignee as the present application, herein totally incorporated by reference, describes a simpler method of handling data, which produces, a reduced color set, representative of the color used in the original image. With reference to FIG. 1, at a first step 10 to producing an approximation or representative reduced number color set, each separation is handled separately from its complements. Using the red separation, labeled RED, as an example, the intensity value, typically an 8 bit value providing up to 256 levels of intensity (or optical density), is encoded at a step 20 to a much smaller value between about 3 levels and 8 levels of intensity. The number of levels chosen for each separation now represent the full range of each color, albeit with more widely spaced intervals. The number of levels retained is selected based upon experimentation to determine a number of levels that produce an esthetically pleasing reduced color set for display purposes. It is, of course, important that the reduced color set to be produced have an appearance close to the original image, or color modification will have no value. Since a simple threshold application, which could be used, will produce undesirable image artifacts, a conversion which smooths the image across levels of conversion is desirable. Several well known dithering and/or error conversion methods are known for this purpose. The well-known Floyd-Steinberg Error Diffusion Algorithm (1976), or one of many derivative error diffusion methods, distribute the difference error derived in the encoding arrangement over adjacent pixels for image smoothing. One such derivative technique is described in U.S. patent application Ser. No. 07/404,395 by Venable et al., entitled "Color Set Selection and Color Imaging". It has been determined that the number of levels $N_x$, of each color for a set which suitably approximates the original color image is approximately 4 red levels ($N_R$), 8 green levels ($N_G$), 3 blue levels ($N_B$). There are a number of other combinations, including 5 red levels, 5 green levels, 4 blue levels; or 5 red levels, 6 green levels, 3 blue levels. Other schemes are possible and depend for their desirability on the user's perception of the color accuracy of such approximations. In this process, black images must be converted to r, g, b values, where r=g=b (see step 10).

In step 30, the new color values of the color separations are combined to produce a single index number for each pixel, that indicates one of the r, g, b triplets possible in the index of the reduced color set. Using the set of 4 red levels, 8 green levels, 3 blue levels, derives a total of 96 color levels or triplets ($N_R \times N_G \times N_B$). Thus, each pixel in the original image having 16 million possible colors is represented by one of these triplets, by mapping through the LUT, through the index of numbers indicating the reduced color set. The color index is created by taking combinations of the amounts of red represented by $N_R$ levels of red, the amounts of green represented by $N_G$ levels of green, and the amounts of blue represented by $N_B$ levels of blue. Together, the 96 levels or triplets will be referred to as the "standard color look up table". Esthetically, it has been determined that a limited number of color levels, in the range of 27-120 levels, serves as an adequate representation of the original color image. Particularly satisfactory results are found in the range of about 90 to 100 levels. The lowest number of levels usable depends somewhat on user perception, but also on the resolution of the display. On a relatively high resolution display, the problem of noise created through the use of the error diffusion or thresholding algorithms is minimized. Obviously, control of color rendition that will ultimately be applied to the original image is not as fine as with a larger number of levels, but for many purposes, the lower number of levels may suffice. The highest number of levels is preferably selected as 120, although a higher number of levels, up to 256 levels, may be used in accordance with the invention. Similarly, if a ten bit graphics system is used, the limit would be 1024 levels. Beyond about a 16 bit graphics system, however, the advantage of the invention is lost in the increased computational time. At step 35, the reduced color set r, g, b image is displayed.

Figure 2:
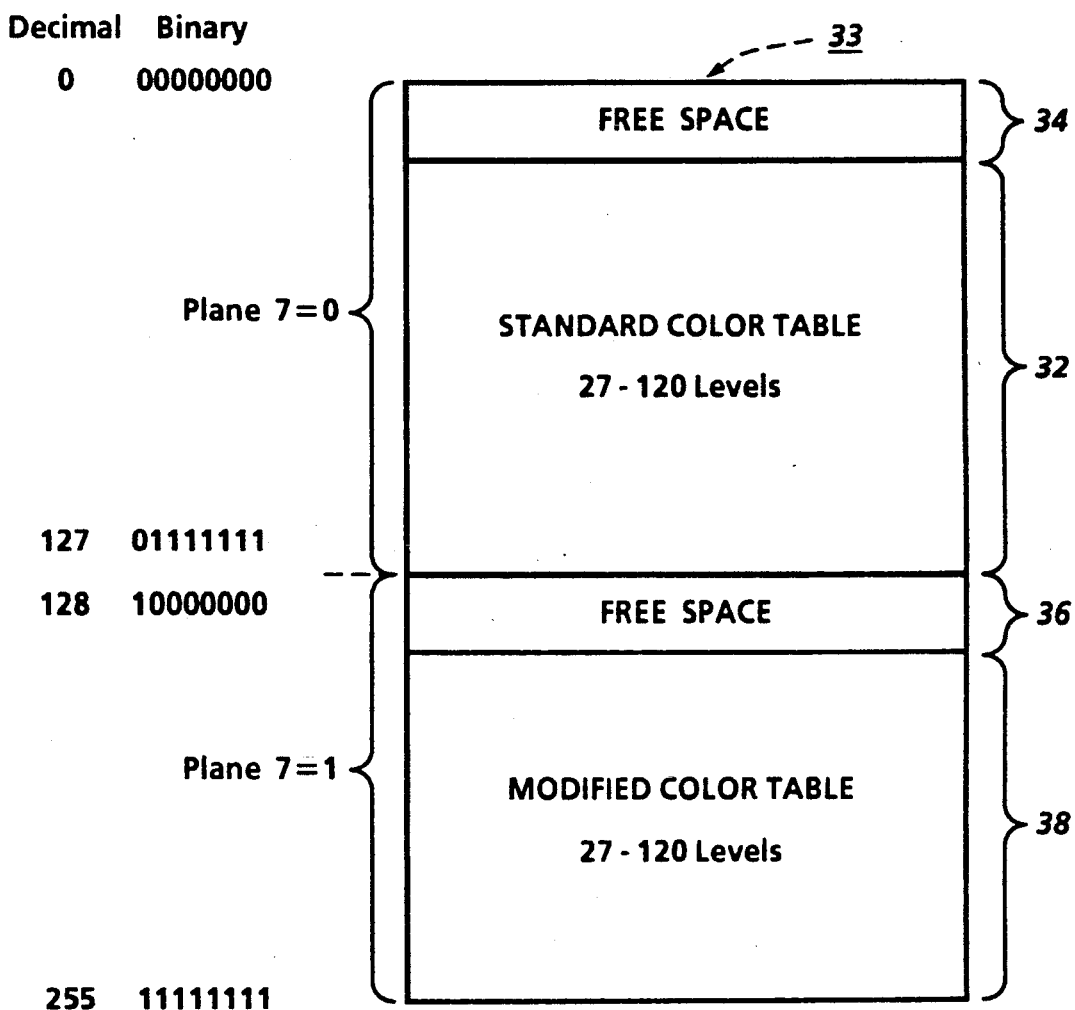
FIG. 2 shows the memory mapping of the color set in an 8 bit system which allows a standard color set and modified color set to exist on a single display.

As shown in FIG. 2, color tables are stored in a 256 level look up table 33 (LUT 33) in the described 8 bit graphics system, with the mapping of FIG. 2, where the standard color table is stored in a portion 32 of LUT 33. Portions 34 and 36 are free space for colors that are unique to other display applications. Portion 38 is a modified color table, that will be explained hereinafter. If more than 128 levels are desired for color modification, there may be room for only a single LUT. Two look up tables are desirable so that other images or portions of the image being modified on the display, may be mapped to a standard color LUT, and are not modified simultaneously with the subject image.

At step 50, modification of the color image may occur in a manner similar to that of a color television set, which most users are familiar with. User interface I may be used for the selection of foreground and background colors. User interface I allows selection of foreground and background colors through color manipulation in hue, saturation and brightness. The control operation is converted to variations in r, g, b values. Additional controls, 46, 47, 48, and 49 respectively labeled "Original", "Cancel", "Apply" and "Foreground/Background", represent functions for the application of color modifications to the image, where "Original" toggles the displayed image between the original color LUT and the modified color LUT, "Cancel" cancels or nullifies any changes made to the displayed image to return to the appearance of the original, as defined by the standard color LUT, "Apply" actually applies the changes specified by the sliders to the image, as will be explained hereinafter, and "Foreground/Background" indicates whether foreground or background color is being selected. In a possible arrangement, the sliders or "gauges" 44 are selectable and dragged to appropriate positions with a mouse-driven cursor (not shown), while the additional controls are areas for selection by the mouse-driven cursor for activation of those functions. Of course, the displayed controls might be on a touch screen, activatable by user touch. An additional feature that may or may not be provided at the user interface is selection of a threshold level or levels which define a level at which lines or background are distinguished from the remainder of the image.

Figure 3:
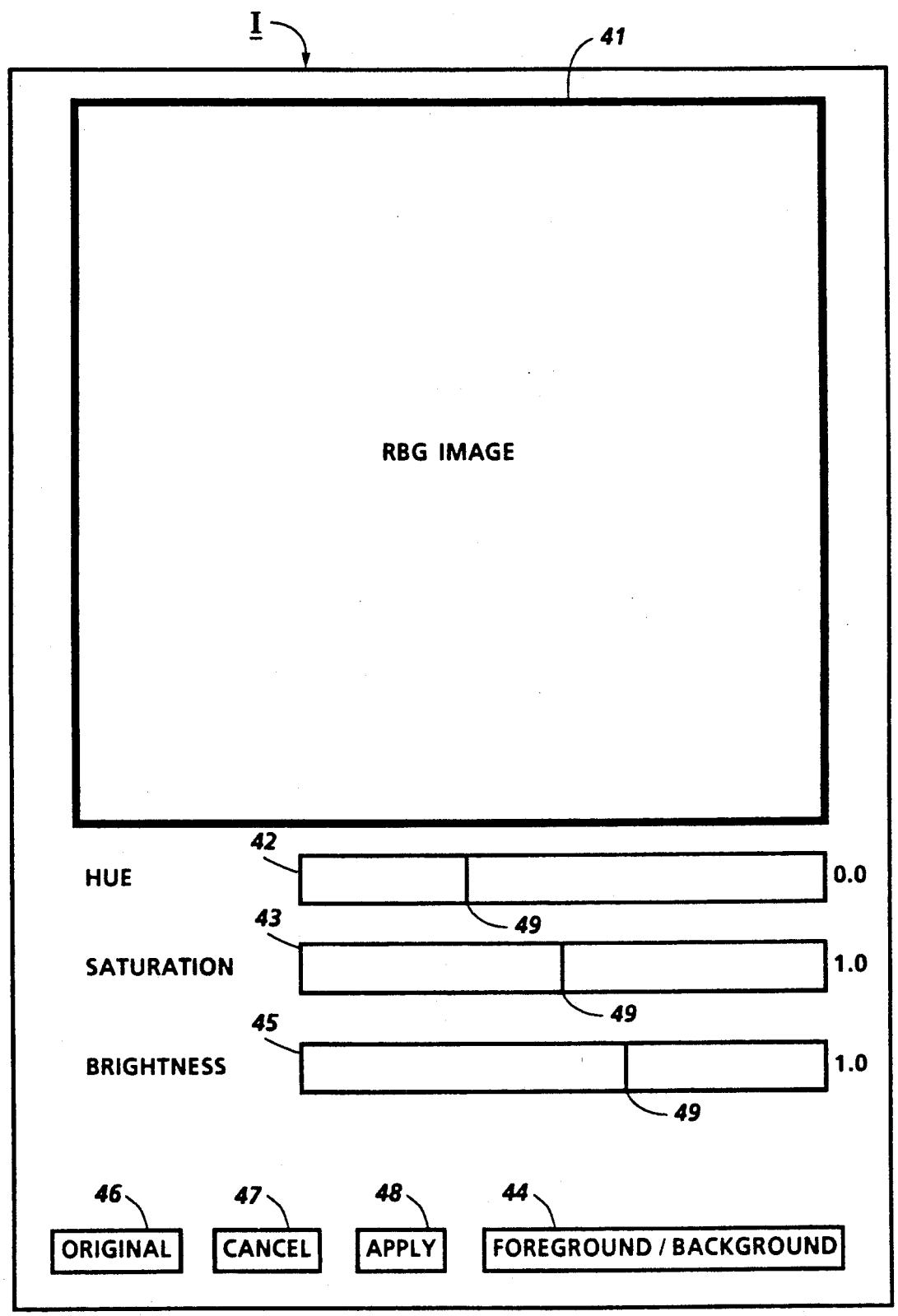
FIG. 3 shows a user interface, usable in association with the described invention.

Modifications made to the color set in the standard color table 22 create a new color set in the modified color table 28. In turn, the new r, g, b triplets defined as a result of the conversion are displayed (step 60) to reflect the changes. Since only a small number of values (27-120) are being changed, the modification made at the user interface I of FIG. 3 are applied to the displayed image in essentially real time.

At step 70, once a desired color modification is derived, changes made to the image that are stored may be applied to the original image. This operation is not expected to occur in real time, and may be referred to a high speed computer on a network for processing. Alternatively, and because the user expects the delay and can select the time of its occurrence, the user's processor on the user's own workstation may apply the luminance/chrominance equations to the 24 bit/pixel data.

At step 80, the newly modified 24 bit/pixel data is again displayed on the workstation, in the reduced color set mode. The image displayed may vary slightly from the image as modified, since many imaging artifacts that appear on the screen during modification are removed when the underlying original image is changed.

It will of course be appreciated that when speaking about an "image", the reference is to that portion of an entire image for which modification is desired. Accordingly, the color of an entire image may be varied, or the color of only a user defined portion of the image might be varied, through standard area definition methods.

In accordance with the invention, and with reference to FIG. 4, a flow chart is shown demonstrating the inventive process, modifications to the LUT values at step 50 of the FIG. 1 method occur as follows: an area of interest (step 210) is selected in accordance with any of several well known area selection routines that define one or more pixels as in an area of interest. Pixels in the areas of interest are mapped to LUT portion 38, which initially, may have the same values as LUT 32. It will, of course, no doubt be appreciated that the area of interest could be the entire image, and accordingly, no actual selection of an area would be required. At step 215, any "black" in the system is converted to an r, g, b triplet where $r=g=b$. By black, the reference herein is to a color black, as opposed to some combination of r, g, b. In the case of "full black", i.e., the darkest black possible, the values of r, g and b are taken as the densest value of each that is possible in the system. For grays, the values will be more than the densest value of each that is possible in the system. Entries into the r, g, b lookup table are made in accordance with the described encoding method, so that for each different black or gray level value present in the image, the pixels having that black or gray level are mapped to an r, g, b triplet in the r, g, b lookup table. It will be understood that pixels to be modified are mapped to LUT portion 38, while non-modified pixels remain mapped to LUT portion 32.

Image values are selected and set for establishing a background color $r_b$, $g_b$, $b_b$ (step 220) and foreground color $r_f$, $g_f$, $b_f$ (step 230) to differentiate background from lines (which for the purpose of this disclosure are considered "foreground"). In the context of the limited set of encoded values used in the color selection method, this entails selecting an r, g, b triplet that represents the desired output colors. This may be done via the UI I of FIG. 3, which applies changes to an r, g, b triplet for storage in a standard look up table.

The next part of the process is dependent upon whether the process is used in the interactive color editing scheme described as an embodiment herein, or in a scheme where each pixel is identified by an individual value r, g, b, such as in the conversion of the original image in background processing. In the interactive color editing scheme defined, pixels to be modified are defined only by a reference to one of a limited number of entries in LUT 38. Thus, at step 250, a determination is made as to whether each color the look up table color in the selected area is a background or foreground color, by thresholding the values of the r, g, b triplets in LUT 38, to which the pixel is mapped, in comparison to a selected threshold level. A reasonable value for this threshold level is taken to be 75% of the maximum white value of the system, or, in a system where white=255, a threshold level or value is established at 196. Where the color or r, g, b triplet to which the pixel is mapped is equal to or exceeds the value of 196, the pixel is deemed to be background. The color or r, g, b triplet to which the pixel is mapped is tested to determine if $R \geq$ threshold AND $G \geq$ threshold AND $B \geq$ threshold. This is an AND function, and therefore, to find that a pixel is a background pixel, all three tests must be met. Accordingly, highly saturated colored lines are treated as foreground pixels, as the test for background pixels is not met by such pixels. Each background color is then converted to the selected background $r_b, g_b, b_b$ triplet (step 260). Pixels mapped to those colors change in appearance at the display. By using the look up table for the comparison process, with its limited number of entries, rather than proceeding on a pixel-by-pixel basis, significant speed of processing is obtained.

Figure 4A:
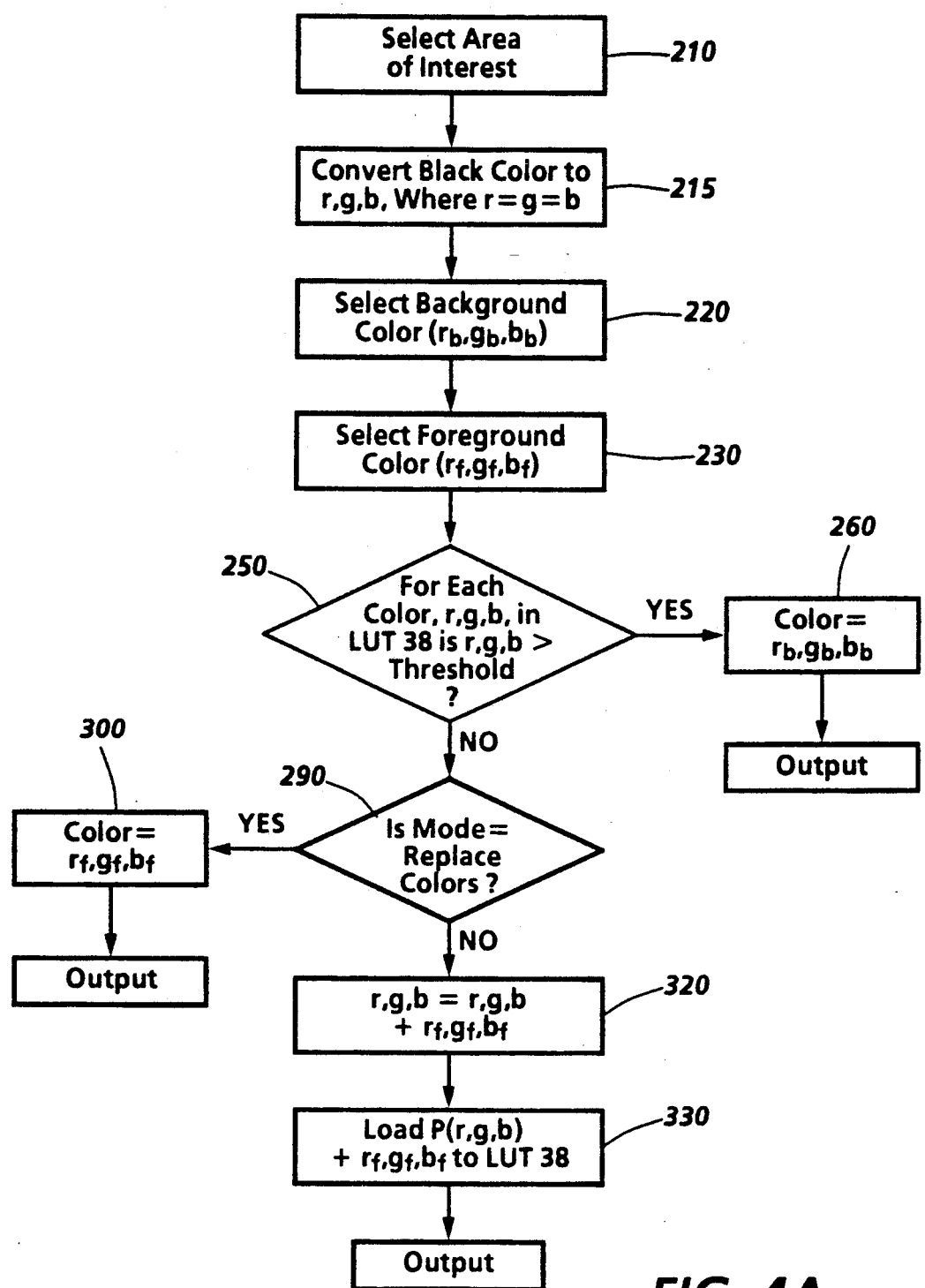
FIGS. 4A and 4B show flow charts of the present method that varies the color of lines and background in an image on a differentiated basis.
Figure 4B:
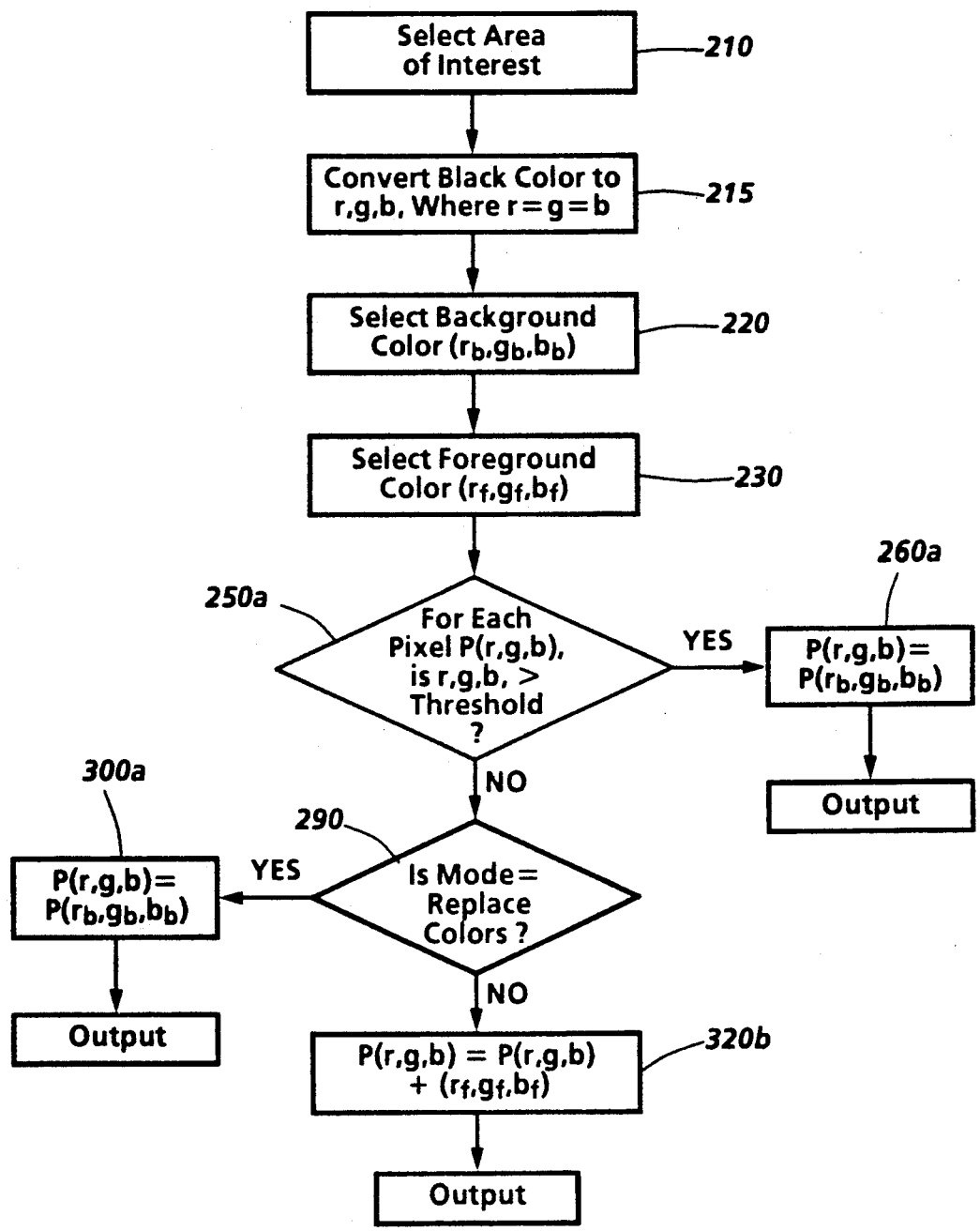

With reference to FIG. 4B, in a scheme where each pixel is identified by an individual value r, g, b is used, then the comparison step 250a asks whether, for each pixel value P(r,g,b), is the r, g, b value of the pixel is greater than a threshold. If it is, at step 260a, the pixel value is set to $r_b, g_b, b_b$.

In the simplest embodiment of the invention, all colors (FIG. 4A) or pixel values (FIG. 4B) that are not background colors or pixel values, are determined to be foreground colors or pixel values (step 300, 300a), and the color of the look up table entries or the pixel values are changed accordingly.

In one embodiment of the invention, shown in FIG. 4A and 4B, a mode of color replacement choice is provided at step 290. If mode=replace, then each look up table color (FIG. 4A) or pixel value (FIG. 4B) that is determined to have a foreground value, is set to the foreground r, g, b triplet (step 300, 300a). In a slightly more complex case of the invention, if mode is not equal to replace, then at step 320 and 320a, color r, g, b or pixel value P(r,g,b) is set to either r, g, b+$r_f, g_f, b_f$ (for color in LUT 38) or P(r,g,b)+$r_f, g_f, b_f$ (for pixel values). The effect of this choice is that for black lines, which are commonly represented as 0 in a system where white=255, the color or pixel will have an set of r, g, b values=$r_f, g_f, b_f$. However, in the case where the line is gray, where r=g=b≠0, the new color or pixel will have a value that is offset from the gray value by the values $r_f, g_f, b_f$, or alternatively, the color selected will have the gray density gradation imposed on it, and reflect the gray gradation of the line that is converted to color. A similar effect is noted for the conversion of lines having fully saturated color, and lines have less than fully saturated color. To accomplish this change, at step 330, selected color value $r_f, g_f, b_f$ is added to the then current color value mapped to the particular pixel in the LUT 38. Step 330 is not necessary in the FIG. 4B embodiment.

Figure 5:
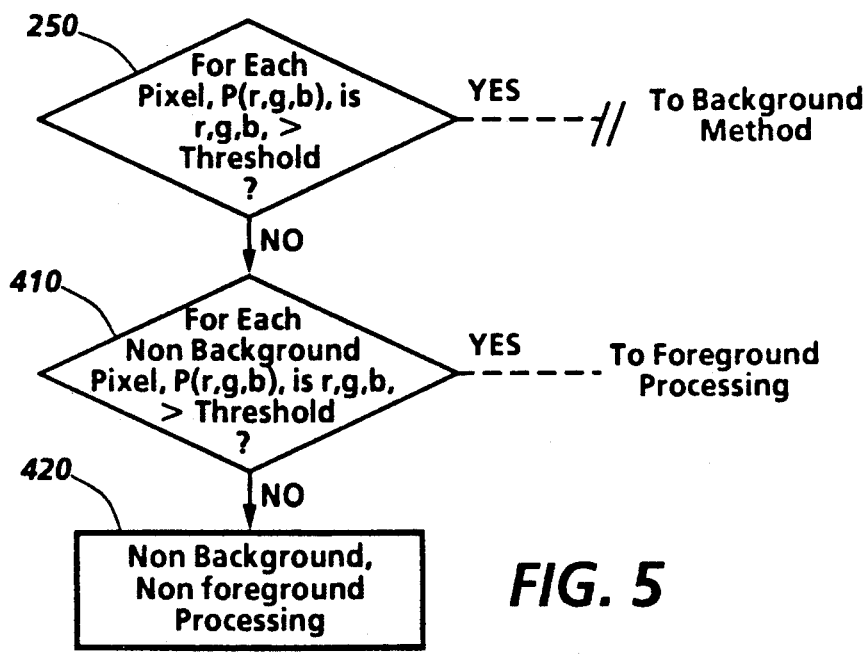
FIG. 5 shows an alternative embodiment of the invention.

In yet another variation of the invention, and as shown in FIG. 5, after determining whether the color or pixel is a background pixel, a subsequent determination may be made as to whether the pixel is a foreground pixel. (This embodiment is shown only for the FIG. 4B embodiment, although equally applicable to the FIG. 4A embodiment.) This is accomplished at step 410, by comparing the color or pixel value determined not to be a background pixel to a second threshold level, where a threshold is selected to identify black lines. by setting a threshold, for example at 25% (or 75% of white value), mostly gray images that do not approach the density of black will be excluded from the foreground color replacement. This may be of interest, so that lines may be varied in color and background may be varied in color, while gray images stay the same, or are converted to a third color. Threshold levels that have effective esthetic values might be in the range of 15-30%.

It will no doubt be appreciated that other mechanisms for mapping a color to a particular pixel exist, aside from the described reduced color set method herein described. It will also be appreciated that while the particular gray level imposition method is the addition of a desired color in a system where black is given as the minimum in the system and white is the maximum, an equivalent operation is available in systems where black is given as the maximum in the system, and white is the minimum. Alternatively, a conversion step for converting from one system to the other could be provided. The principle of the invention as described and claimed simply requires that an operation be accomplished where the gradation of the original pixel can be imposed on the color to be substituted.

The invention has been described with reference to a particular embodiment. Modifications and alterations will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. In an image including line art and defined by pixels, each pixel having a value indicative of an optical density value of the image at a discrete point therein in terms of black values, or a combination of red, green and blue values, and where the image includes a plurality of unconnected lines and background, lines including a set of pixels having optical density values distinct from optical density values of pixels in background, a method of changing a color of at least one of the lines and the background, including the steps:

a) converting the value of each pixel to a combination of a red value, a green value and a blue value, where combinations of red, green and blue values define all possible colors in a color set, and any black value is converted to a combination of a red, a green and a blue value where the red value=green value=blue value;

b) selecting a line color, identified in terms of red, green and blue values;

c) selecting a background color, identified in terms of red, green and blue values;

d) comparing the red, green and blue values of each pixel to a reference value;

e) determining from said comparison whether the pixel is a background pixel or a line pixel;

f) setting the value of said pixel equal to the line color, identified in terms of red, green and blue values or the background color, identified in terms of red, green and blue values, in accordance with said determination; and displaying the image in terms of the red, green and blue values selected as line color and background color.

2. In an image including line art defined by pixels, each pixel having a value indicative of an optical density value of the image at a discrete point therein, and where the image includes a plurality of unconnected lines and background, lines including a set of pixels having optical density values distinct from optical density values of pixels in background, a method of changing a color of at least one of the lines and the background, including the steps:

a) converting the value of each pixel to a combinations of red, green and blue values, where combinations of red, green and blue values defined all possible colors in a color set, and black values are converted to a combination of red, green and blue values where the red value=green value=blue value;

b) selecting a line color, identified in terms of red, green and blue values;

c) selecting a background color, identified in terms of red, green and blue values;

d) comparing the red, green and blue values of each pixel with a reference value;

e) determining from said comparison whether the pixel is a background pixel;

f) for each background pixels so determined, changing said pixel value to the background color;

g) for any pixel not determined to be a background pixel, adding to said pixel value the red, green and blue values identifying said foreground color; and h) displaying the image in terms of the red, green and blue values selected as line color and background color.

3. The method as described in claim 2, wherein as black values vary, the combination of red, green and blue values to which black values are converted varies.

4. The method as described in claim 2, wherein the selected reference value is almost a white value.

5. The method as described in claim 4, wherein the almost a white value is greater than 70-85% of a maximum possible white value.

6. The method as described in claim 4, wherein the almost a white value is selectable over of a range of values representing a value distinguishing between background pixel values and foreground pixel values.

7. In an image defined by a set of pixels, each pixel having a value indicative of an optical density value of the image at a discrete point therein in terms of gray values varying over a range of white to black, and wherein the image includes a plurality of unconnected lines and background, lines including a set of pixels having gray values other than white, a method of changing a color of at least one of the lines and the background, including the steps:

a) converting the gray value of each pixel to a combination of red, green and blue values, where combinations of red, green and blue values defined all possible colors in a color set, and gray values are converted to a combination of red, green and blue values where the red value=green value=blue value;

b) selecting a line color, identified in terms of red, green and blue values;

c) selecting a background color, identified in terms of red, green and blue values;

d) comparing each pixel to a threshold value selected to identify background pixels;

e) determining from said comparison whether the pixel is a background pixel;

f) for each background pixel so determined, changing said pixel value to the background color;

g) for any pixel not determined to be a background pixel, comparing each pixel to a threshold value selected to identify foreground pixels;

h) determining from said comparison whether the pixel is a line pixel;

i) for each line pixel so determined, changing said pixel value to the foreground color; and j) for any pixel determined not to be either a line pixel or a background pixel, applying neither the line or background colors to said pixel.

8. In an original image defined by a set of pixels in a memory, each pixel having an m-bit gray value indicative of an optical density value of the image at a discrete point therein varying over a range from white to black, and wherein the image includes a plurality of unconnected lines and background, lines including a set of pixels having gray values other than white, a method of changing a color of at least one of the lines and the background, including the steps:

a) for each m-bit pixel value, generating a representative n-bit pixel value, where n<m, and a gray value, and the set of n-bit values defines all possible colors in an image;

b) converting the n-bit pixel value of each pixel to an n-bit combination of red, green and blue values, where combinations of red, green and blue values defined all possible colors in a color set, and gray values are converted to an n-bit combination of red, green and blue values where the red value=-green value=blue value;

b) displaying the image in term of n-bit red, green and blue pixel values;

c) selecting a line color, identified in terms of n-bit red, green and blue values;

d) selecting a background color, identified in terms of n-bit red, green and blue values;

e) comparing each n-bit combination of red, green and blue values to a threshold value selected to identify background combination of red, green and blue values;

f) determining from said comparison whether the n-bit combination of red, green and blue value is a background color;

g) for each background color so determined, changing said n-bit red, green and blue pixel value to the background color;

h) changing all n-bit red, green and blue pixel values not identified as background pixels to the foreground color; and i) redisplaying the the image in terms of red, green and blue pixel values in accordance with any red, green and blue pixel value changes.

9. The method as described in claim 8, including the steps of:

j) converting each of said threshold value, n-bit background color and n-bit foreground color respectively to m-bit values;

k) converting the m-bit gray value of each pixel to an m-bit combination of red, green and blue values, where combinations of red, green and blue values defined all possible colors in the m-bit color set, and gray values are converted to an m-bit combination of red, green and blue values where the red value=green value=blue value;

l) comparing each m-bit pixel value in the original image to the threshold value selected to identify background pixels;

m) determining from said comparison whether the pixel is a background pixel;

n) for each background pixel so determined, changing said m-bit pixel value to the m-bit background color;

o) changing all pixels not identified as background pixels to the m-bit foreground color.

* * * * *